(12) United States Patent
Finn et al.

(10) Patent No.: US 6,446,007 B1
(45) Date of Patent: Sep. 3, 2002

(54) METHOD FOR CONTROLLED-AMPLITUDE PRESTACK TIME MIGRATION OF SEISMIC DATA

(75) Inventors: Christopher J. Finn, Missouri City; Graham A. Winbow, Houston, both of TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/419,588

(22) Filed: Oct. 18, 1999

Related U.S. Application Data

(60) Provisional application No. 60/107,120, filed on Nov. 5, 1998, and provisional application No. 60/107,633, filed on Nov. 9, 1998.

(51) Int. Cl.[7] .............................................. G06F 19/00
(52) U.S. Cl. ............................................. 702/14; 703/5
(58) Field of Search .............................. 702/12, 13–18; 367/52, 50, 72; 705/5

(56) References Cited

U.S. PATENT DOCUMENTS

| | | | |
|---|---|---|---|
| 4,980,866 A | 12/1990 | Wang et al. | 367/52 |
| 5,138,584 A | 8/1992 | Hale | 367/53 |
| 5,392,255 A | 2/1995 | LeBras et al. | 367/50 |
| 5,500,832 A | 3/1996 | Berryhill | 367/51 |
| 5,586,026 A | 12/1996 | Highnam et al. | 364/421 |
| 5,719,822 A | 2/1998 | Wang | 367/53 |
| 5,764,516 A | * 6/1998 | Thompson et al. | 364/421 |
| 5,940,778 A | 8/1999 | Marfurt et al. | 702/16 |
| 6,049,759 A | 4/2000 | Etgen | 702/14 |
| 6,131,071 A | * 10/2000 | Partyka et al. | 702/16 |

FOREIGN PATENT DOCUMENTS

| | | | |
|---|---|---|---|
| WO | WO 97/00485 | 1/1997 | G06F/17/14 |
| WO | WO 99/36800 | 7/1999 | G01V/1/28 |

OTHER PUBLICATIONS

Bleistein, Norman. "On the Imaging of Reflectors in the Earth," *Geophysics*, vol. 52, No. 7, (Jul. 1987) pp. 931–942.

Schneider, William A. "Integral Formulation for Migration in Two and Three Dimensions," *Geophysics*, vol. 43, No. 1, (Feb. 1978) pp. 49–76.

Stolt, R. H. "Migration by Fourier Transform," *Geophysics*, vol. 43, No. 1 (Feb. 1978) pp. 23–48.

Etgen, John T. "V(z) F–K prestack migration of common–offset common–azimuth data volumes, part I: theory," 68th Annual International Meeting of the Society of Exploration Geophysicists, Expanded Abstracts, Paper No. ST 13.6, pp. 1835–1838 (Sep. 13–18, 1998).

Rietveld, Walter E. A. et al. "V(z) F–K prestack migration of common–offset common–azimuth data volumes; part II: practical issues and examples," Paper No. SP 7.8, pp. 1285–1288.

(List continued on next page.)

*Primary Examiner*—Edward Lefkowitz
*Assistant Examiner*—Victor J. Taylor
(74) *Attorney, Agent, or Firm*—Keith A. Bell

(57) ABSTRACT

A method for controlled-amplitude prestack time migration of seismic data traces. According to the inventive method, common-offset gathers of the prestack seismic data traces are 3-D Fourier transformed from the space-time domain to a preselected alternate data domain, such as the frequency-wavenumber domain, the wavenumber-time domain, or the slant-stack domain. A migration operator that substantially preserves the seismic amplitudes of the original data traces is computed in the $\vec{p}$-z domain. This migration operator is applied to the transformed data traces in the alternate data domain, an imaging condition is applied, and the resulting migrated data traces are then transformed back to the space domain.

14 Claims, 9 Drawing Sheets

OTHER PUBLICATIONS

Schleicher, J. et al., "3–D true–amplitude finite–offset migration," *Geophysics,* vol. 58, No. 8 pp. 1112–1126 (Aug. 1993).

Hanitzsch, Christian. "Comparison of weights in prestack amplitude preserving Kirchhoff depth migration," *Geophysics,* vol. 62, No. 6 pp. 1812–1816 (Nov.–Dec. 1997).

Dubrulle, Augustin A. "Numerical methods for the migration of constant–offset sections in homogeneous and horizontally layered media," *Geophysics,* vol. 48, No. 9pp. 1195–1203 (Sep. 1983).

Kim, Y. C. et al. "Recursive wavenumber–frequency migration," *Geophysics,* vol. 54, No. 3 pp. 319–329 (Mar. 1989).

Hale, Dave et al. "Imaging salt with turning seismic waves," *Geophysics,* vol. 57, No. 11 pp. 1453–1462 (Nov. 1992).

Hubral, P., Slant Stack Processing, pp. 111–117, edited by G. Gardner and L. Lu, published by the Society of Exploration Geophysicists (1991).

Winbow, Graham A. "Controlled amplitude time migration," Society of Exploration Geophysicists Annual Meeting, Expanded Abstracts, Paper No. SMig1.7, pp. 1153–1155 (1995).

* cited by examiner

METHOD FOR CONTROLLED-AMPLITUDE PRESTACK TIME MIGRATION OF SEISMIC DATA

REFERENCE TO RELATED APPLICATIONS

This application claims the benefit of U.S. Provisional Application No. 60/107,120 filed Nov. 5, 1998 and U.S. Provisional Application No. 60/107,633 filed Nov. 9, 1998.

FIELD OF THE INVENTION

This invention relates generally to the field of seismic prospecting and, more particularly, to imaging of seismic data. Specifically, the invention is a method for controlled-amplitude prestack time migration of seismic data.

BACKGROUND OF THE INVENTION

In the oil and gas industry, seismic prospecting techniques are commonly used to aid in the search for and evaluation of subterranean hydrocarbon deposits. A seismic prospecting operation consists of three separate stages: data acquisition, data processing, and data interpretation. The success of a seismic prospecting operation is dependent on satisfactory completion of all three stages.

In the data acquisition stage, a seismic source is used to generate a physical impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by an array of seismic receivers located at or near the surface of the earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface geologic structure from the recorded seismic data for use during the data interpretation stage. The image is developed using theoretical and empirical models of the manner in which the seismic signals are transmitted into the earth, attenuated by the subsurface strata, and reflected from the geologic structures. The quality of the final product of the data processing stage is heavily dependent on the accuracy of the procedures used to process the data.

The purpose of the data interpretation stage is to determine information about the subsurface geology of the earth from the processed seismic data. For example, data interpretation may be used to determine the general geologic structure of a subsurface region, or to locate potential hydrocarbon reservoirs, or to guide the development of an already discovered reservoir. Obviously, the data interpretation stage cannot be successful unless the processed seismic data provide an accurate representation of the subsurface geology.

Typically, some form of seismic migration (also known as "imaging") must be performed during the data processing stage in order to accurately position the subsurface seismic reflectors. The need for seismic migration arises because variable seismic velocities and dipping reflectors cause seismic reflections in unmigrated seismic images to appear at incorrect locations. Seismic migration is an inversion operation in which the seismic reflections are moved or "migrated" to their true subsurface positions.

There are many different seismic migration techniques. Some of these migration techniques are applied after common-midpoint (CMP) stacking of the data traces. (As is well known, CMP stacking is a data processing procedure in which a plurality of seismic data traces having the same source-receiver midpoint but different offsets are summed to form a stacked data trace that simulates a zero-offset data trace for the midpoint in question.) Such "poststack" migration can be done, for example, by integration along diffraction curves (known as "Kirchhoff" migration), by numerical finite difference or phase-shift downward-continuation of the wavefield, or by equivalent operations in frequency-wavenumber or other domains.

Conversely, other seismic migration techniques are applied before stacking of the seismic data traces. In other words, these "prestack" migration techniques are applied to the individual nonzero-offset data traces and the migrated results are then stacked to form the final image. Prestack migration typically produces better images than poststack migration. However, prestack migration is generally much more expensive than poststack migration. Accordingly, the use of prestack migration has typically been limited to situations where poststack migration does not provide an acceptable result, e.g., where the reflectors are steeply dipping.

In some cases, reflector dip can exceed 90 degrees. As is well known in the art, it may be possible to image these "overturned" reflectors using data from seismic "turning rays." Prestack migration techniques must be used in order to obtain an accurate image of overturned reflectors from seismic turning ray data.

There are two general types of prestack migration, prestack time migration and prestack depth migration. The present invention relates to prestack time migration which is used in situations where the subsurface seismic velocity varies in the vertical direction, but can be regarded as approximately constant laterally. Prestack time migration is widely used in the petroleum industry; it is generally considered applicable to most (but not all) prospects.

In practice, prestack time migration is usually approximated by a composite procedure involving successive steps of normal moveout correction (denoted as "NMO"), followed by dip moveout correction (denoted as "DMO"), followed by zero-offset migration (referred to as "ZOM"). This sequence of processes is performed on collections of seismic data traces having the same or nearly the same source-receiver separation distance and the same or nearly the same azimuthal orientation (referred to as "common-offset, common-azimuth gathers"). It is known from experience that the combination of these imaging steps results in a good approximation to prestack time migration in most situations. The approximation tends to be less accurate in situations where there are dipping reflectors in a medium whose velocity varies significantly with depth. In such situations, the inaccuracies manifest themselves in mispositioned images of seismic reflectors, as well as in distorted amplitudes. A principal advantage of the decomposition of prestack time migration into the NMO/DMO/ZOM sequence is that the required algorithms execute rapidly on commonly available digital computers, which results in economical processing.

Kirchhoff prestack migration is the only commonly known method of performing prestack time migration which overcomes the inaccuracies of the NMO/DMO/ZOM decomposition mentioned in the previous paragraph, and which is applicable to common offset gathers. However, Kirchhoff prestack migration, as compared to the NMO/DMO/ZOM decomposition, is generally very expensive and time consuming. For this reason, the seismic data processing industry is continuing its efforts to develop techniques that can be used to produce accurate prestack migrations in an economical manner.

In Kirchhoff prestack migration, the data in a common-offset gather are summed over all source-receiver midpoints (denoted by $\vec{\xi}$). During Kirchhoff summation, the data are time shifted by an amount that depends on the assumed seismic velocity structure in the earth. The time shift is denoted by the symbol $t_D(\vec{\xi}, \vec{x})$, which depends on the midpoint location $\vec{\xi}$ and the imaged point $\vec{x}=(x,y,z)$. During summation, the data may be multiplied with a weight w that generally depends on $\vec{\xi}$ and $\vec{x}$. As explained in Schleicher, J. et al., "3-D true-amplitude finite-offset migration," Geophysics, volume 58, pp. 1112–1126 (1993), the weight w may be chosen in such a way that the migration processing preserves the seismic amplitudes. This is usually considered very desirable, since the amplitudes are widely used in interpreting the processed data.

The Kirchhoff prestack migration process may be expressed mathematically in the form of equation (1):

$$D_M(\vec{x}) = \left[\frac{\partial}{\partial t}\int d^2\vec{\xi} w(\vec{\eta}, z) D(t+t_D, \vec{\xi})\right]_{t=0} \quad (1)$$

where $D_M(\vec{x})$ is the migrated image at the point $\vec{x}$, $D(t,\vec{\xi})$ denotes the input data at time t and midpoint $\vec{\xi}$, and $w(\vec{\eta},z)$ is the weight function discussed above, expressed as a function of $\vec{\eta}$ and z (depth). The variable $\vec{\eta}$ in equation (1) is the displacement between the input trace midpoint and the surface coordinates of the image point, $\vec{\eta} = \vec{x} - \vec{\xi}$. Since, as explained above, offset is held fixed during prestack migration, there is no reference to it in equation (1) or any of the other equations set forth herein.

A sketch of the geometry is included in FIG. 1. A seismic source 10 and a seismic receiver 12 are located on the surface of the earth 14. The midpoint between source 10 and receiver 12 is indicated by $\vec{\xi}$. Incident seismic ray 16 encounters subsurface reflector 18 at reflection point $\vec{x}$, and the resulting reflected seismic ray 20 is received by seismic receiver 12. The seismic signal traveltime from source 10 to reflection point $\vec{x}$ is $t_1$. The seismic signal traveltime from reflection point $\vec{x}$ to receiver 12 is $t_2$. The total seismic signal traveltime is denoted by $t_D=t_1+t_2$. As noted above, the horizontal displacement between midpoint $\vec{\xi}$ and the surface (i.e., x and y) coordinates of reflection point $\vec{x}$ is represented by $\vec{\eta}$.

In equation (1), the initial partial derivative indicates that the data should be differentiated with respect to time in order to preserve the shape of the seismic pulse during processing. All quantities in equation (1) are taken to be at fixed source-receiver offset. As more fully discussed below, a difficulty with implementation of equation (1) is that the summation over $\vec{\xi}$ generally requires time-consuming computation.

Equation (1) operates in the space-time ($\vec{\xi}$-t) domain. For the special situation of zero-offset migration, it is well known that equation (1) can be implemented more efficiently by operating in the frequency-wavenumber ($\omega$-$\vec{k}$) domain. This is described, for example, in Kim et al., "Recursive wavenumber-frequency migration," Geophysics, volume 54, pp. 319–329 (1989).

In Dubrulle, "Numerical methods for the migration of constant-offset sections in homogeneous and horizontally layered media," Geophysics, volume 48, pp. 1195–1203 (1983), the author hypothesized a possible approach to $\omega$-$\vec{k}$ migration at finite offset, and demonstrated his method applied to a simple example for 2-D data. However, Dubrulle did not discuss how to implement his method for 3-D data. In addition, Dubrulle did not address the issue of how to implement $\omega$-$\vec{k}$ migration to preserve seismic amplitudes, nor did he address the issue of how to handle seismic turning rays. The present invention overcomes these limitations.

A recent example of a prestack time migration method which operates in the frequency-wavenumber domain and has similar accuracy to Kirchhoff prestack migration is described in Etgen, "V(Z) F-K migration of common-offset common-azimuth data volumes, part I: theory," 68th Annual International Meeting of the Society of Exploration Geophysicists, Expanded Abstracts (Sep. 13–18, 1998). According to Etgen, accurate prestack time migration can be performed using multiplication in the $\omega$-$\vec{k}$ domain of a migration operator with the data volume.

The method proposed by Etgen is shown pictorially in FIG. 2. The unmigrated common-offset data traces $D(t,\vec{\xi})$ are 3-D Fourier transformed from the space-time ($\vec{\xi}$-t) domain to the frequency-wavenumber ($\omega$-$\vec{k}$) domain resulting in transformed data $\tilde{D}(\omega,\vec{k})$. In FIG. 2, this is represented by the transformation from data cube 22 to data cube 24. The migration operator $M(\omega,\vec{\eta},z)$ is first computed in the $\omega$-$\vec{\eta}$ domain for every depth $z_1, z_2, \ldots z_N$. In FIG. 2, the migration operator is represented by cubes 26, 28, and 30 for depths $z_1, z_2$, and $z_N$, respectively. Migration operator $M(\omega,\vec{\eta},z)$ is then 2-D Fourier transformed for every frequency $\omega$ and every depth z into the frequency-wavenumber ($\omega$-$\vec{k}$) domain resulting in transformed migration operator $\tilde{M}(\omega,\vec{k},z)$. In FIG. 2, the transformed migration operator is represented by cubes 32, 34, and 36 for depths $z_1, z_2$, and $z_N$, respectively. The transformed migration operator $\tilde{M}(\omega,\vec{k},z)$ for each depth is then multiplied by the transformed data $\tilde{D}(\omega,\vec{k})$. For each depth $z_1, z_2, \ldots z_N$, the migrated data are then summed over frequency to form an image $\tilde{D}_M(\vec{k},z)$ in the wavenumber domain. In FIG. 2, this is represented by images 38, 40, and 42 for depths $z_1, z_2$, and $z_N$, respectively. Finally, the wavenumber domain migrated images $\tilde{D}_M(\vec{k},z)$ are 2-D Fourier transformed from the wavenumber domain back to the space domain resulting in migrated data $D_M(\vec{x},z)$, which is represented in FIG. 2 by migrated data cube 44.

The method described by Etgen is substantially faster than Kirchhoff prestack migration according to equation (1), but is dominated by the costs of computing and transforming the migration operator repeatedly for each depth. As further described below, in some embodiments of the present invention the unmigrated data traces are transformed to the $\omega-\vec{k}$ domain in the same manner as proposed by Etgen; however, the present invention computes and applies the migration operator in a unique way that requires significantly less computer resources than the Etgen method.

From the foregoing, it can be seen that there is a need for a method for economically achieving accurate prestack migration of seismic data. Such a method should be capable of accurately preserving the seismic amplitudes of the unmigrated data. Such a method should also be capable of imaging reflectors having very steep dips, including reflectors having dips above 90 degrees dip angle such as may be found, for example, adjacent to salt structures in the Gulf of Mexico. The present invention satisfies this need.

SUMMARY OF THE INVENTION

In one embodiment, the present invention is a method for prestack time migration of common-offset seismic data traces which comprises the steps of (1) selecting a seismic velocity function for use in the prestack time migration, (2) transforming the common-offset seismic data traces from the space-time ($\vec{\xi}$-t) domain to a preselected alternate data domain, (3) using the seismic velocity function to compute a time function in the $\vec{p}$-z domain for accurately migrating the seismic data traces, (4) computing a weighting function in the $\vec{p}$-z domain, which weighting function substantially preserves the seismic amplitudes of the seismic data traces, (5) using the time function to phase shift the seismic data traces in the alternate data domain, (6) multiplying the amplitudes of the phase-shifted seismic data traces by the weighting function, (7) summing the phase-shifted and amplitude-weighted data over an appropriately chosen variable so as to form an image in said alternate data domain, and (8) performing a 2-D transformation of the image from the alternate data domain back to the space ($\vec{x}$-z) domain.

The preselected alternate data domain may be the $\omega-\vec{k}$ domain, the $\vec{k}$-t domain, or the $\tau-\vec{p}$ domain.

The inventive method also permits imaging of seismic turning ray energy for non-zero source-receiver offsets.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that are included within the spirit and scope of the invention, as defined by the appended claims.

DETAILED DESCRIPTION OF THE INVENTION

The present invention is a method for efficiently achieving rapid, controlled-amplitude prestack time migration of seismic data. According to the inventive method, common-offset, common-azimuth gathers of seismic data traces (hereinafter referred to as "common-offset data gathers") are transformed from the space-time ($\vec{\xi}$-t) domain to a preselected alternate data domain where they are migrated using a unique migration operator which is computed in the $\vec{p}$-z domain. The migrated data traces are then transformed back to the space domain. Examples of appropriate alternate data domains for use in connection with the present invention are the frequency-wavenumber ($\omega-\vec{k}$) domain, the wavenumber-time ($\vec{k}$-t) domain, and the slant-stack ($\tau-\vec{p}$) domain. In the following detailed description, the invention will be described with respect primarily to implementation in the $\omega-\vec{k}$ domain. However, it should be understood that this is for illustrative purposes only and does not constitute a limitation on the scope of the invention which also may be implemented advantageously in the $\vec{k}$-t or $\tau-\vec{p}$ domains.

Preferably, the inventive method is practiced using a suitably programmed digital computer or parallel processor. Persons skilled in the art of seismic data processing could easily develop computer software for implementing the inventive method based on the teachings set forth herein.

According to the present invention, controlled-amplitude prestack time migration in the $\omega-\vec{k}$ domain is implemented using the following migration equation:

$$D_M(\vec{x}) = \int d^2\vec{k}\, e^{-i\vec{k}\cdot\vec{x}} \int d\omega\, e^{i\omega T(\vec{\eta},z)} \tilde{D}(\omega,\vec{k}) \frac{w(\vec{\eta},z)}{K_{3D}^{1/2}(\vec{\eta},z)} \qquad (2)$$

where $D_M(\vec{x})$ is the migrated image at point $\vec{x}$, $\tilde{D}(\omega,\vec{k})$ represents the input data after Fourier transformation with respect to time and midpoint so as to transform the data to the $\omega-\vec{k}$ domain, $T(\vec{\eta},z)$ is the migration time shift function, and $w(\vec{\eta},z)/K_{3d}^{1/2}(\vec{\eta},z)$ is an amplitude-preserving weight function.

Figure 3:
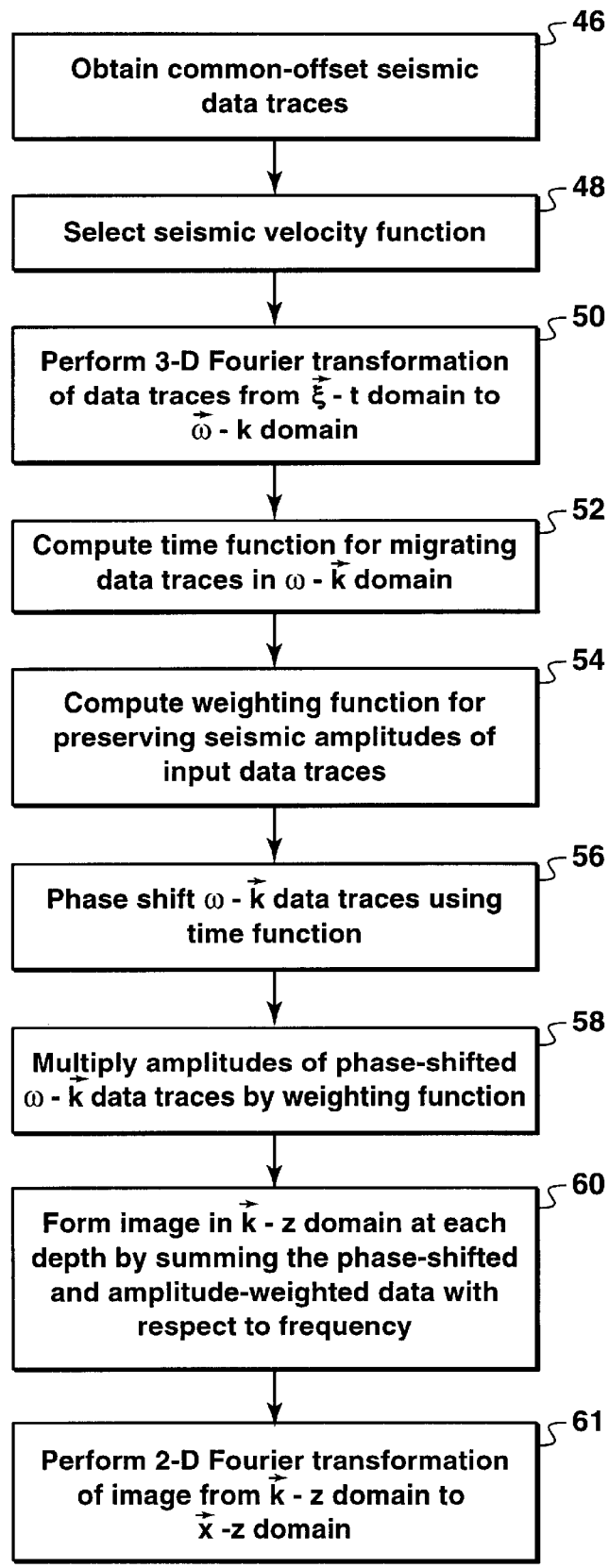
FIG. 3 is a flow chart illustrating the basic steps of prestack time migration in the $\omega-\vec{k}$ domain according to one embodiment of the present invention.

FIG. 3 is a flowchart illustrating the principal steps used in performing controlled amplitude prestack time migration in the $\omega-\vec{k}$ domain according to equation (2). At step 46, a set of common-offset seismic data traces is obtained. Initially, these data traces are in the space-time ($\vec{\xi}$-t) domain. Next, at step 48, a seismic velocity function for the subsurface region in question is selected. As noted above, a basic assumption of the present invention is that the subsurface seismic velocity is a function of depth or time, but is laterally invariant. Lateral velocity variation, for example due to a sloping sea floor, can be taken into account by first applying NMO with a selected local velocity and then applying a reverse NMO with the velocity used subsequently to migrate the data. Techniques for selecting an appropriate seismic velocity function for use in the present invention are well known to persons skilled in the art and, accordingly, will not be described further herein.

At step 50, the common-offset data traces obtained at step 46 are 3-D Fourier transformed from the $\vec{\xi}$-t domain to the $\omega-\vec{k}$ domain. In equation (2), the Fourier transformed data traces are denoted by $\hat{D}(\omega, \vec{k})$.

At step 52, the seismic velocity function selected at step 48 is used to compute a time function for use in migrating the transformed data traces in the $\omega-\vec{k}$ domain. This time function is denoted by $T(\vec{\eta}, z)$ in equation (2) and is defined by:

$$T(\vec{\eta}, z) = t_D - \vec{p} \cdot \vec{\eta} \qquad (3)$$

where $$\vec{p} = \left(\frac{\partial t_D}{\partial \vec{\eta}}\right)_z \qquad (4)$$

is the midpoint ray parameter computed at fixed depth. As is well known to those skilled in the art, the ray parameter $\vec{p}$ is the horizontal component of the slowness vector. As further described below, the time function $T(\vec{\eta}, z)$ is converted to the $\vec{p}$-z (dip-depth) domain before it is applied to the transformed data traces.

At step 54, a weighting function for preserving the seismic amplitudes of the input data traces is computed. As noted above, the weighting function is denoted by $w(\vec{\eta}, z)/K_{3D}^{1/2}(\vec{\eta}, z)$ in equation (2).

$w(\vec{\eta}, z)$ is the weight function described by Schleicher et al., referred to above. According to Schleicher et al., the weight function depends on $\vec{\xi}$ and $\vec{x}$, and is given by:

$$w(\vec{\xi}, \vec{x}) = \frac{\sqrt{\cos\alpha_S \cos\alpha_G}}{v_S} \frac{|det(N_{SR} + N_{RG})|}{\sqrt{|det\ N_{SR}|}\sqrt{|det\ N_{RG}|}} \qquad (5)$$

where $\alpha_s$ is the surface dip angle of the ray connecting the source $\vec{s}$ and the reflection point $\vec{x}$, $\alpha_G$ is the surface dip angle of the ray connecting the receiver $\vec{g}$ and the reflection point $\vec{x}$, $v_s$ is the surface compressional wave velocity, and the matrices are given by:

$$N_{SR} = \begin{pmatrix} \frac{\partial^2 t_1}{\partial \xi_x \partial \rho} & \frac{\partial^2 t_1}{\partial \xi_y \partial \rho} \\ \frac{\partial^2 t_1}{\partial \xi_x \partial \sigma} & \frac{\partial^2 t_1}{\partial \xi_y \partial \sigma} \end{pmatrix} \qquad (6a)$$

and, $$N_{RG} = \begin{pmatrix} \frac{\partial^2 t_2}{\partial \xi_x \partial \rho} & \frac{\partial^2 t_2}{\partial \xi_y \partial \rho} \\ \frac{\partial^2 t_2}{\partial \xi_x \partial \sigma} & \frac{\partial^2 t_2}{\partial \xi_y \partial \sigma} \end{pmatrix} \qquad (6b)$$

where $\rho$ and $\sigma$ are coordinates on a plane tangential to the reflector at the reflection point R. Given a knowledge (for example, from a time map) of the rays connecting the source and receiver to the reflection point, all of the above derivatives can be calculated. The source and receiver locations are $\vec{s} = \vec{\xi} + \vec{h}$ and $\vec{g} = \vec{\xi} - \vec{h}$, where $\vec{h}$ is the half-offset as a two-dimensional vector on the earth's surface. Since $\vec{\eta} = \vec{x} - \vec{\xi}$, the weight function $w(\vec{\xi}, \vec{x})$ may be expressed as a function of $\vec{\xi}$ and $\vec{x}$ or as a function of $\vec{\eta}$ and z. Alternatively, the weight function $w(\vec{\eta}, z)$ can be computed using dynamic ray tracing, as described in Hanitzsch, "Comparison of weights in prestack amplitude preserving Kirchhoff depth migration," *Geophysics,* volume 62, pp. 1812–1816 (1997).

The factor $K_{3D}(\vec{\eta}, z)$ is a normalization factor used to adjust for differences between working in $\vec{x}$ space and working in $\vec{k}$ space. $K_{3D}(\vec{\eta}, z)$ is defined by the following equation:

$$K_{3D}(\vec{\eta}, z) det\left[\frac{\partial^2 t_D}{\partial \eta_i \partial \eta_j}\right] \qquad (7)$$

where the indices i and j take on the values x and y corresponding to the two components of the variable $\vec{\eta}$.

As with the time function $T(\vec{\eta}, z)$, the amplitude-preserving weighting function $w(\vec{\eta}, z)/K_{3D}^{1/2}(\vec{\eta}, z)$ is converted to the $\vec{p}$-z (dip-depth) domain before it is applied to the transformed data traces. This conversion is described in detail below.

At step 56, the transformed data traces $\hat{D}(\omega, \vec{k})$ are phase shifted using the time function calculated at step 52.

Next, at step 58, the phase-shifted data traces are multiplied by the amplitude-preserving weighting function calculated at step 54.

Finally, at steps 60 and 61, the phase-shifted and weighted data traces are transformed from the $\omega-\vec{k}$ domain back to the $\vec{x}$-z domain. This is accomplished in two stages. First, at step 60, an image is formed in the wavenumber ($\vec{k}$) domain by summing with respect to frequency $\omega$. Then, at step 61, the $\vec{k}$ domain image is 2-D Fourier transformed back to the $\vec{x}$ domain. The result of this process is $\vec{x}$-z domain migrated data traces in which the migration process has preserved seismic amplitudes.

The functions T and $w/K_{3D}^{1/2}$ are together referred to as the "migration operator," $\vec{M} = (T, w/K_{3D}^{1/2})$. A fundamental difficulty in the implementation of equation (2) arises because the functions T and $w/K_{3D}^{1/2}$ are initially calculated in $\vec{\eta}$–z space while the transformed data traces are in $\omega$–$\vec{k}$ space. To overcome this difficulty, T and $w/K_{3D}^{1/2}$ are first converted to the $\vec{p}$–z domain, as further described below. The conversion of T and $w/K_{3D}^{1/2}$ to $\vec{p}$–z space permits an efficient implementation of equation (2) since points in $\vec{p}$–z space can be related to points in $\omega$–$\vec{k}$ space using the following relationship:

$$\vec{p} = \omega/\vec{k}. \qquad (8)$$

Figure 4:
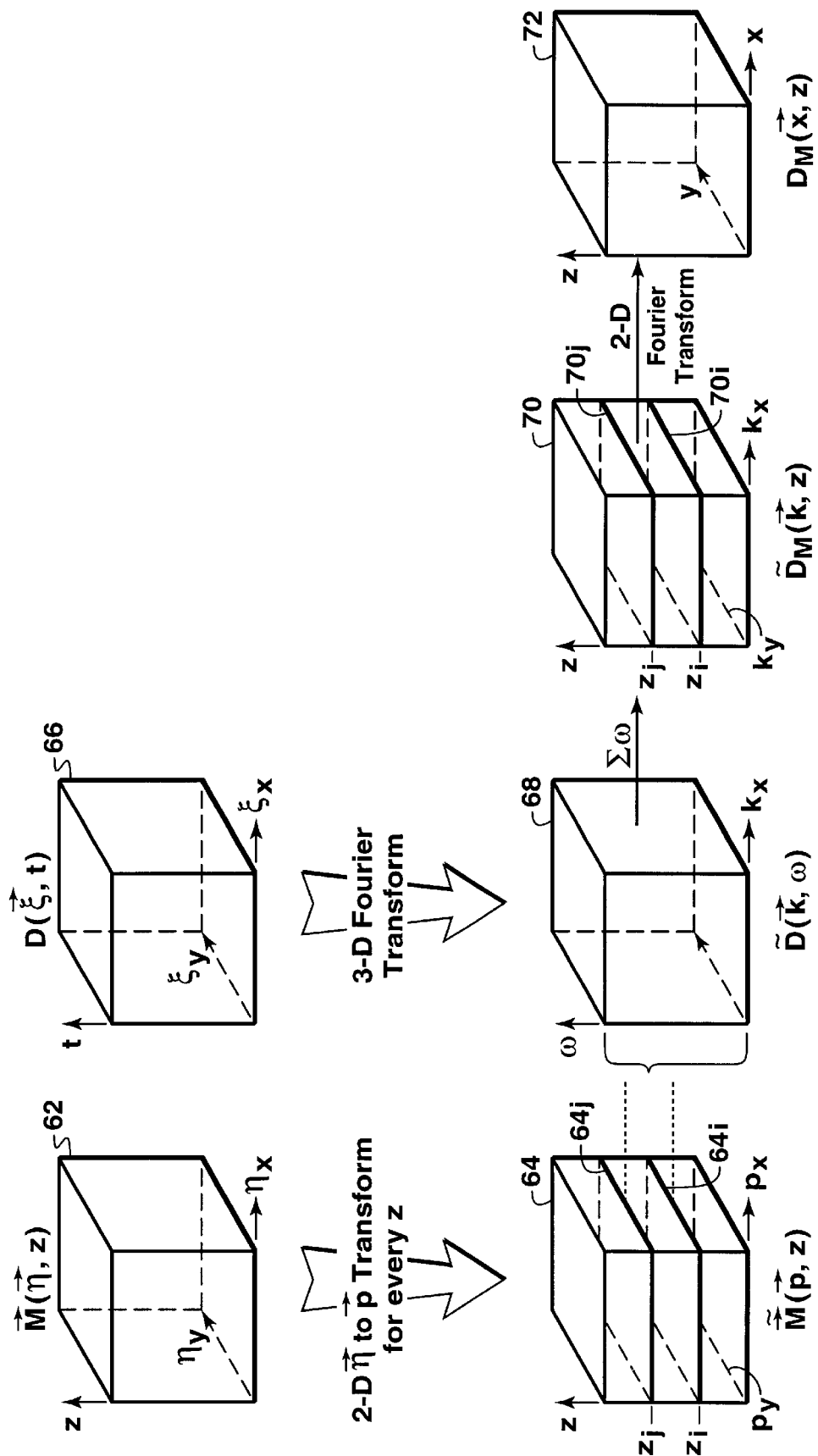
FIG. 4 is a pictorial representation of prestack time migration in the $\omega-\vec{k}$ domain according to the present invention.

Implementation of the present invention is shown pictorially in FIG. 4. Preferably, the migration operator (i.e., the functions T and $w/K_{3D}^{1/2}$) is first computed in three-dimensional $\vec{\eta}$–z space. In FIG. 4, the three-dimensional migration operator $\vec{M}(\vec{\eta},z)$ is represented by cube 62. For every z, the two-dimensional $\vec{\eta}$ coordinate is mapped (i.e., transformed) to a two-dimensional $\vec{p}$ coordinate. This produces a three-dimensional migration operator $\tilde{M}(\vec{p},z)$ in $\vec{p}$–z space, which is represented in FIG. 4 by cube 64. The space-time ($\vec{\xi}$–t) domain data $D(\vec{\xi},t)$ are 3-D Fourier transformed into wavenumber-frequency ($\vec{k}$–$\omega$) domain data $\tilde{D}(\vec{k},\omega)$. In FIG. 4, the $\vec{\xi}$–t domain data are represented by cube 66, and the $\vec{k}$–$\omega$ domain data are represented by cube 68. According to the present invention, a single z-slice of the migration operator $\tilde{M}(\vec{p},z)$ in the $\vec{p}$–z domain (e.g., slice 64i or 64j) can be used to migrate all of the data in the $\omega$–$\vec{k}$ domain to a fixed output depth z by virtue of the relationship in equation (8). The migrated data are then summed with respect to frequency producing a single z-slice (e.g., slice 70i or 70j) of the migrated image $\tilde{D}_M(\vec{k},z)$, which is represented in FIG. 4 by cube 70. This is repeated for every z-slice in the migration operator. Finally, the migrated image is 2-D Fourier transformed to the $\vec{x}$–z domain, represented by cube 72. In effect, the present invention reduces the problem of computing and mapping the operator from a four-dimensional problem to a three-dimensional problem. (Compare Etgen's four-dimensional migration operator $\tilde{M}(\omega,\vec{k},z)$ with the three-dimensional migration operator $\tilde{M}(\vec{p},z)$ of the present invention.) Thus, the present invention greatly increases the computational efficiency of the process.

The imaging process is computationally most efficient if the functions T and $w/K_{3D}^{1/2}$ are precomputed for a regularly sampled grid of $\vec{p}$ values to be used in a table look-up procedure during the implementation of equation (2). The mapping of the two components of the migration operator, T and $w/K_{3D}^{1/2}$, from $\vec{\eta}$ space to $\vec{p}$ space greatly improves the efficiency of this invention relative to the technique described by Etgen.

Equation (4) relates $\vec{p}$ space to $\vec{\eta}$ space. In practice, the migration operator is initially computed for a regularly sampled grid in $\vec{\eta}$ space at fixed depth z. Numerical differentiation of $t_D$ according to equation (4) produces $\vec{p} = \vec{p}(\vec{\eta})$ from which T can be assembled according to equation (3). The function $K_{3D}$ can also be constructed from numerical derivatives of $t_D$ according to equation (7). The factors necessary to compute the weight function w can also be constructed from numerical derivatives of $t_D$, as described in Schleicher at al., or they can be computed using dynamic ray tracing, as described by Hanitzsch. For every depth z, the migration operator is then resampled from the regular grid in $\vec{\eta}$ space to a regular grid in $\vec{p}$ space using the computed samples of the function $\vec{p} = \vec{p}(\vec{\eta})$, as described in the following paragraph.

Figure 5:
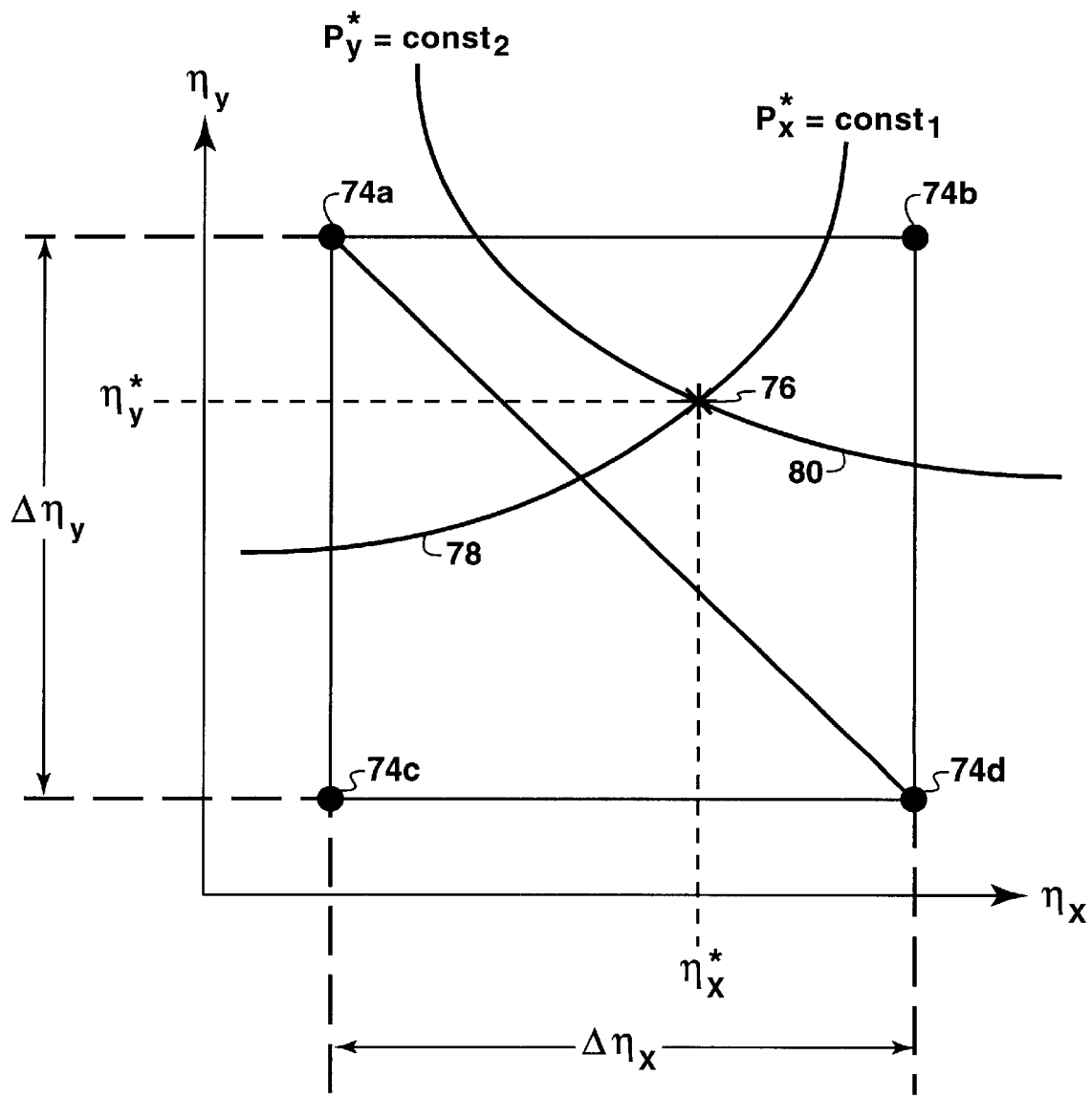
FIG. 5 illustrates the resampling from $\vec{\eta}$ space to $\vec{p}$ space used in calculating the migration operator according to the present invention.

The preferred method of resampling from $\vec{\eta}$ space to $\vec{p}$ space is illustrated in FIG. 5 and is accomplished in the following manner. The Cartesian cells of the regular grid in $\vec{\eta}$ space (e.g., the rectangular cell formed by grid points 74a, 74b, 74c, and 74d) are further decomposed into triangles as shown in FIG. 5, and the values of $\vec{p}$ are computed at the corners of the triangles. Either diagonal may be used when decomposing the rectangle into two triangles. Within each triangle, the function $\vec{p} = \vec{p}(\vec{\eta})$ may be represented by an arbitrary interpolating function denoted $\vec{p} = \tilde{\vec{p}}(\vec{\eta})$, whose parameters are evaluated using the precomputed values of $\vec{p}$ at the corners of the triangle. Using the interpolating function, the minimum and maximum values of $\vec{p}$ within the triangle can be easily computed. Knowing the range of $\vec{p}$, one can deduce whether there potentially exist any points $\vec{p}* = \tilde{\vec{p}}(\vec{\eta}*)$ within the triangle (e.g., point 76) such that $\vec{p}*$ is on the desired regular grid in $\vec{p}$ space. For example, assume that $p_x* = const_1$ and $p_y* = const_2$ is a point on the desired regular grid in $\vec{p}$ space. Contour 78 (FIG. 5) represents the points on the interpolating function for which $const_1 = \tilde{p}_x(\vec{\eta})$. Similarly, contour 80 represents the points on the interpolating function for which $const_2 = \tilde{p}_y(\vec{\eta})$. The intersection of contours 78 and 80 in $\vec{\eta}$ space represents the point $(p_x*,p_y*)$ in $\vec{p}$ space. If any such points exist within the triangle, the value of $\vec{\eta}*$ can be computed by inverting the functional representation $\vec{p}* = \tilde{\vec{p}}(\vec{\eta}*)$. A linear interpolating function is preferred, as inverting the linear function amounts to solving a system of linear equations. Higher order polynomials can be used if desired, in which case non-linear methods yield $\vec{\eta}*$. Once a point $\vec{\eta}*$ has been computed, it is advisable to double-check and verify that its coordinates are within the boundary of the triangle. For each point $\vec{\eta}*$ within the triangle, the migration operator can be interpolated from the precomputed regular grid in $\vec{\eta}$ space at the point $\vec{\eta}*$ to yield $T(\vec{p}*)$ and $w(\vec{p}*)/K_{3D}^{1/2}(\vec{p}*)$, the desired migration operator at the point $\vec{p}*$. This process is repeated for every triangle in $\vec{\eta}$ space. If desired, it is possible to use other decompositions of the original $\vec{\eta}$ grid other than triangles to accomplish the remapping to $\vec{p}$ space. For example, it is possible to use the original rectangular grid in conjunction with a bilinear interpolating function.

As described above, the present invention can be implemented on a conventional digital computer or on a parallel processor. When utilizing a parallel processor, there are a number of options for parallel implementation of equation (2). Equation (2) can be parallelized over depth, frequency, or wavenumber. The preferred method of parallelization is to first share the work of 3-D Fourier transforming the data across the processors according to temporal frequency and then to divide the work of computing and applying the operator across the processors according to depth. Each processor computes the operator for a range of depths and applies it over the same range of depths. This has the advantage that it not only distributes the work of computing and applying the operator, but also divides the memory requirement for holding the operator and image cubes across the processors. When parallelizing in this manner, each processor must access the entire transformed data volume. Because of the size of typical data volumes, it is usually not possible to hold an independent copy in the memory of each processor. To overcome this limitation, the data cube is stored on disk after it has been transformed to the frequency-wavenumber domain. One processor is assigned to asynchronously read frequency slices of the data cube from the disk and asychronously distribute the frequency slices to the other processors while the imaging is taking place. In this algorithm, the processor which has been assigned the task of reading and distributing frequency slices from the disk file (referred to as the I/O processor) is distributing the current frequency slice to all the other processors at the same time that all the other processors are migrating the previous frequency slice. Simultaneous with this, the I/O processor is reading the next frequency slice from the disk. This scheme assures that none of the processors are ever waiting for the data to come off the disk and into their memory. The processors performing the migration (referred to as the migration processors) apply the migration operator to each frequency slice as they receive it. Each migration processor applies the migration operator at every depth which has been assigned to it. The image is formed by summing the migrated frequency slice into an accumulation buffer for each depth. Once all the frequency slices from the input file have been migrated, the migration processors inverse Fourier transform the image from the wavenumber domain to the space domain and then output their imaged depth slices.

When seismic velocity increases with depth in the earth, seismic rays that initially travel downward can turn and head back toward the surface without being reflected from a subsurface reflector. These "turning rays" can then reflect off the underside of overturned reflectors and return to the surface by a path that initially heads downward and then turns upward. Turning rays can be used to image overturned reflectors. Hale et al. ("Imaging salt with turning seismic waves," *Geophysics*, volume 57, pp. 1453–1462 (1992)) discuss an $\omega - \vec{k}$ migration algorithm for imaging turning rays for zero source-receiver separation. The present invention permits imaging of turning ray energy for non-zero source-receiver separation.

Figure 6:
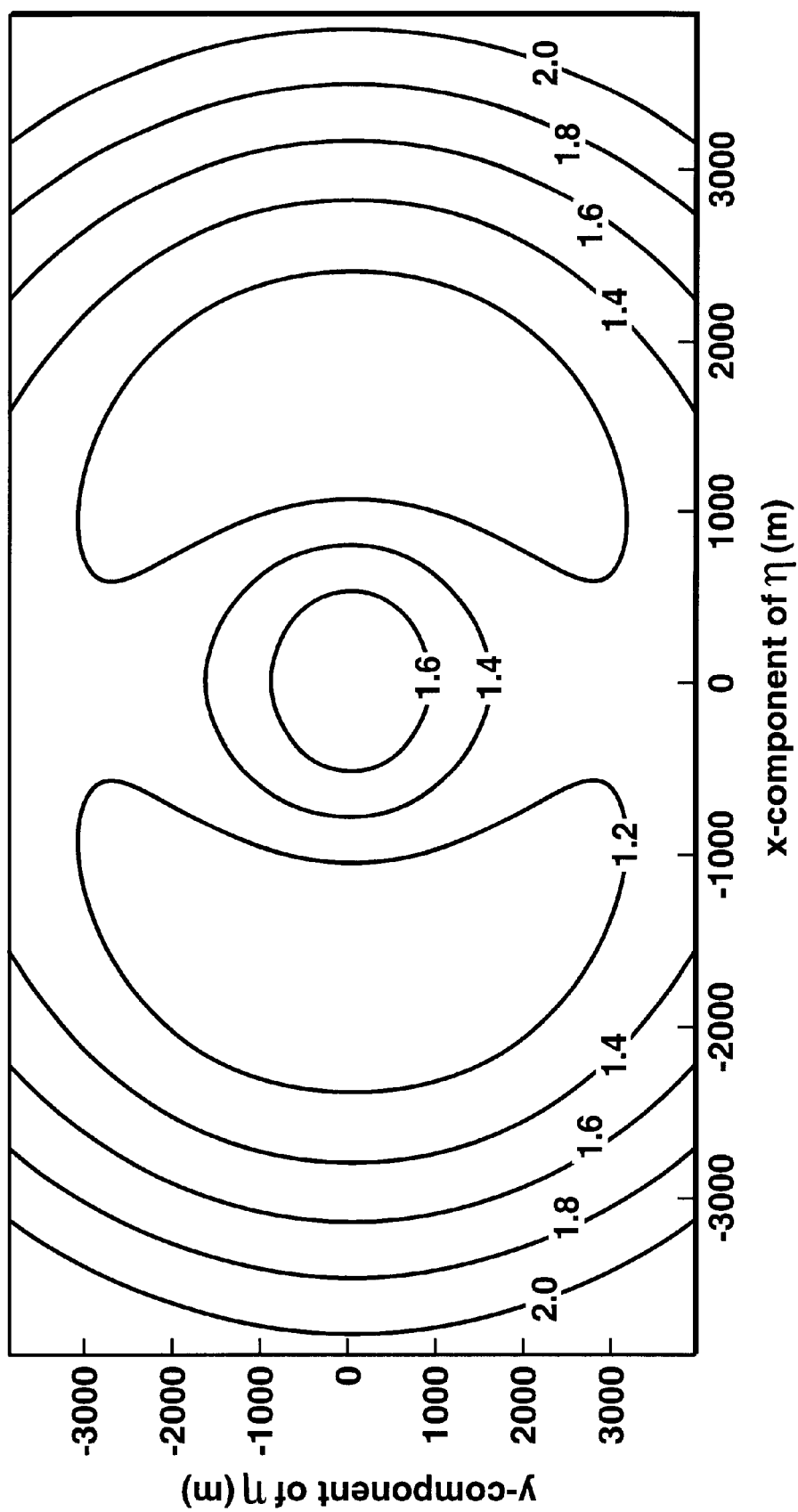
FIG. 6 shows the contours of the migration time shift function T at fixed depth and offset in $\vec{\eta}$ space.
Figure 7:
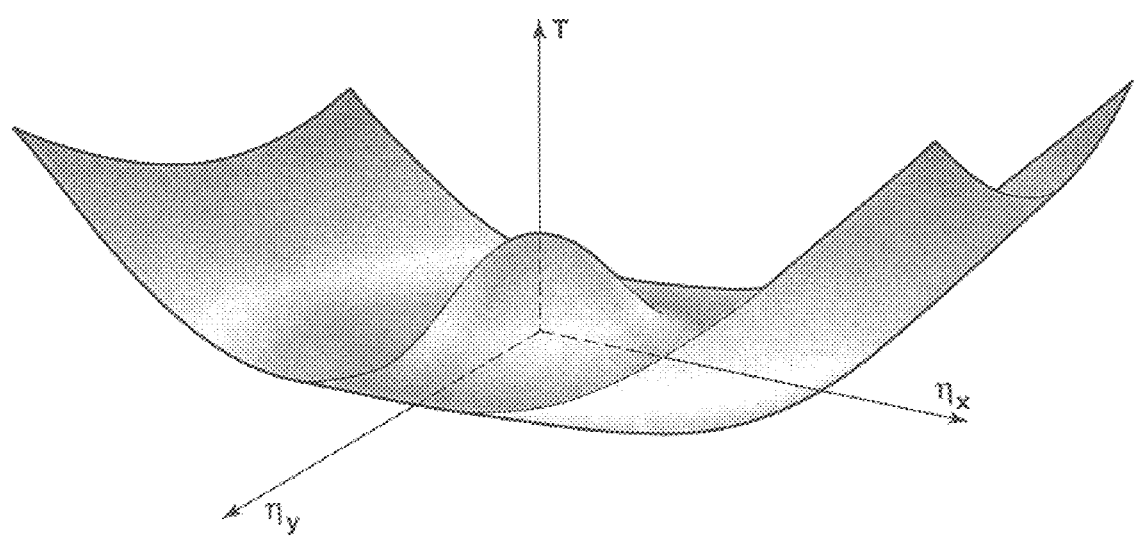
FIG. 7 is a 3-D rendering of the migration time shift function T at fixed depth and offset in $\vec{\eta}$ space.
Figure 8:
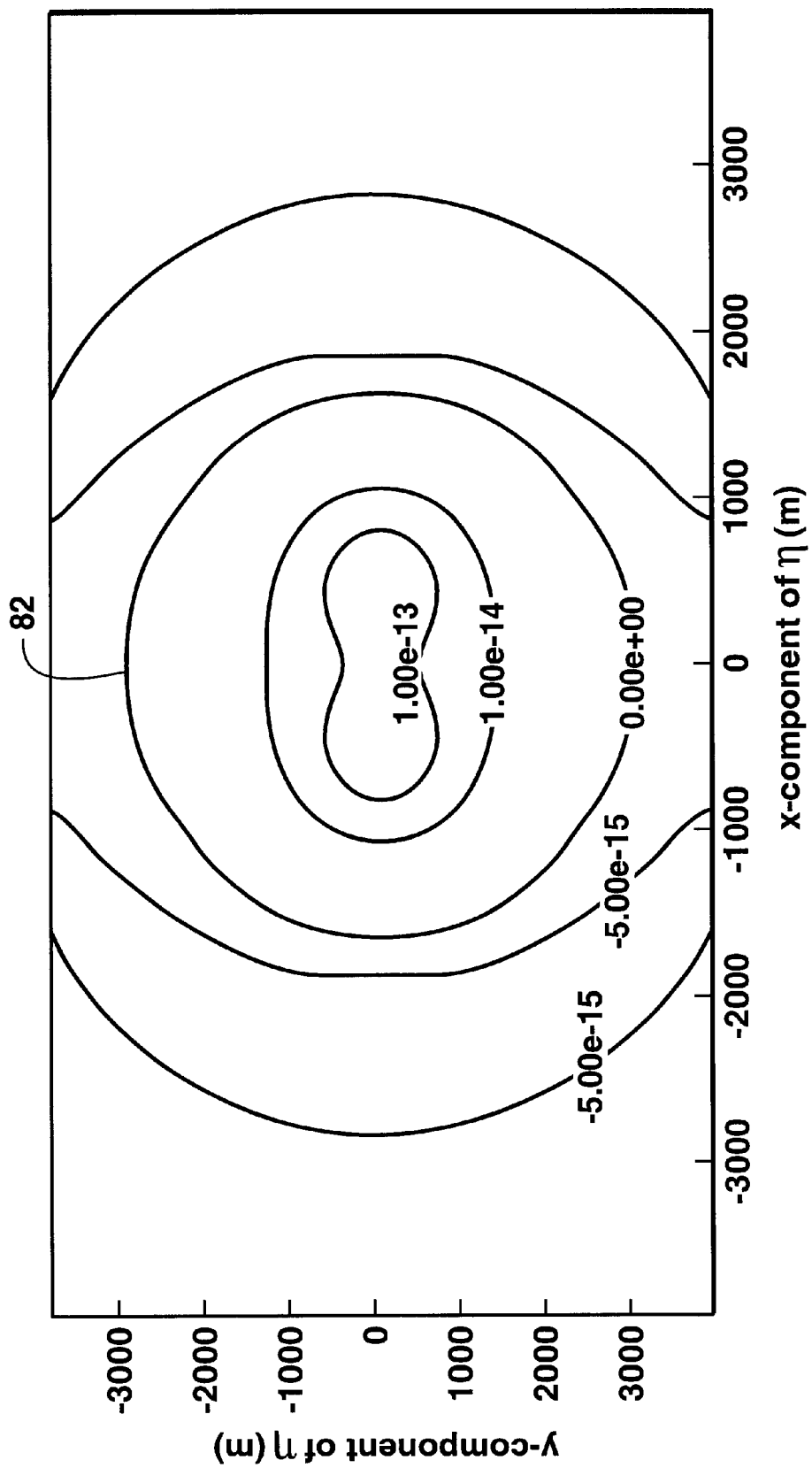
FIG. 8 shows the contours of the $K_{3D}$ factor in $\vec{\eta}$ space.
Figure 9:
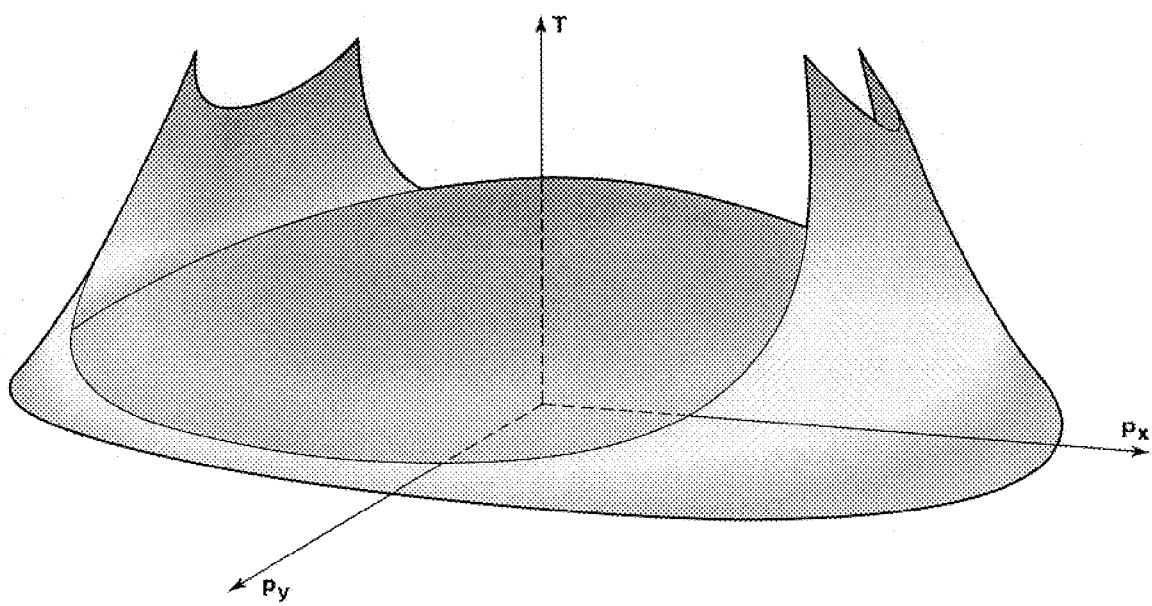
FIG. 9 is a 3-D rendering of the migration time shift function T after it has been converted from $\vec{\eta}$ space to $\vec{p}$ space.

In general, turning rays are recorded at large distances from the overturned reflectors. The algorithm described herein can be used to image turning rays by simply computing the migration operator over a sufficiently large range of $\vec{\eta}$ space to include any turning energy. When the migration operator includes turning ray energy, it becomes double-valued in $\vec{p}$ space. The migration operator has a primary sheet corresponding to energy which does not turn and a secondary sheet corresponding to turning rays. These sheets are easily separated during the resampling process (i.e., the conversion from $\vec{\eta}$ space to $\vec{p}$ space) by taking advantage of the fact that the sign of $K_{3D}$ changes from positive to negative when moving from the primary sheet to the secondary sheet. This is illustrated in FIGS. 6–9. FIG. 6 shows contours of the migration time shift function T at fixed depth and offset in $\vec{\eta}$ space where the function is single-valued, and FIG. 7 is a 3-D rendering of the same migration time shift function T. Note that for any point $(\eta_x, \eta_y)$ in $\vec{\eta}$ space, there is only a single value of the migration time shift function T. FIG. 8 shows contours of $K_{3D}$ in $\vec{\eta}$ space. The zero contour 82 is elliptical in shape. Inside this ellipse, $K_{3D}$ is positive. Outside, it is negative. This fact can be used when mapping the operator from $\vec{\eta}$ space to $\vec{p}$ space. The primary sheet of the operator is in the region where $K_{3D}$ is positive. The secondary sheet of the operator corresponding to turning rays is the region where $K_{3D}$ is negative. FIG. 9 is a 3-D rendering of the migration time shift function T after it has been converted from $\vec{\eta}$ space to $\vec{p}$ space clearly showing the double-valued nature of the function as it is folded over on itself.

When imaging turning rays, equation (2) is computed twice, once for each sheet in the migration operator, and the results are summed. When migrating with the second sheet of the migration operator, the right hand side of equation (2) must be modified by an extra factor of $e^{-i\pi/2}$ in order to have the proper waveform phase on the image of the overturned reflectors.

The computational advantages of the migration technique described above with respect to Kirchhoff prestack migration can be assessed by counting the number of floating point operations required for implementation of equation (2) versus the number required for implementation of equation (1). In equation (2), there are three steps. First, the data traces must be 3-D Fourier transformed from the $\vec{\xi}-t$ domain to the $\omega - \vec{k}$ domain. If the number of data samples in the x, y, and t dimensions are $N_x$, $N_y$, and $N_t$, respectively, then this initial forward 3-D Fourier transformation requires on the order of $N_t N_x N_y \ln(N_t N_x N_y)$ operations. In the second step, the data are imaged by applying the migration operator and performing a summation over frequency. This step must be performed for each image depth and converts the data from $\omega - \vec{k}$ space to $\vec{k}-z$ space. If the number of imaged depths in $N_z$, then the total number of operations in this second step is proportional to $N_z N_x N_y N_t$. In the third step, the data are transformed from $\vec{k}-z$ space to $\vec{x}-z$ space by performing a 2-D Fourier transformation for each depth. The number of operations required for this third step is proportional to $N_z N_x N_y \ln(N_x N_y)$.

The Kirchhoff prestack migration method given in equation (1) requires a 2-D summation over midpoint for each of the image points. Thus, the total number of operations is proportional to $N_x^2 N_y^2 N_z$.

To compare the relative speeds of the two methods, note that for typical problems $N_z = N_x = N_y = N_t = 1000$. Because all of the variables are the same order of magnitude, they can be replaced by the generic variable N. The time required for performing the $\omega - \vec{k}$ migration according to equation (2) is controlled by the second step which is proportional to $N^4$. Kirchhoff prestack migration according to equation (1) is proportional to $N^5$. Thus, prestack migration according to the present invention is a full power of N faster than Kirchhoff prestack migration according to equation (1).

Figure 1:
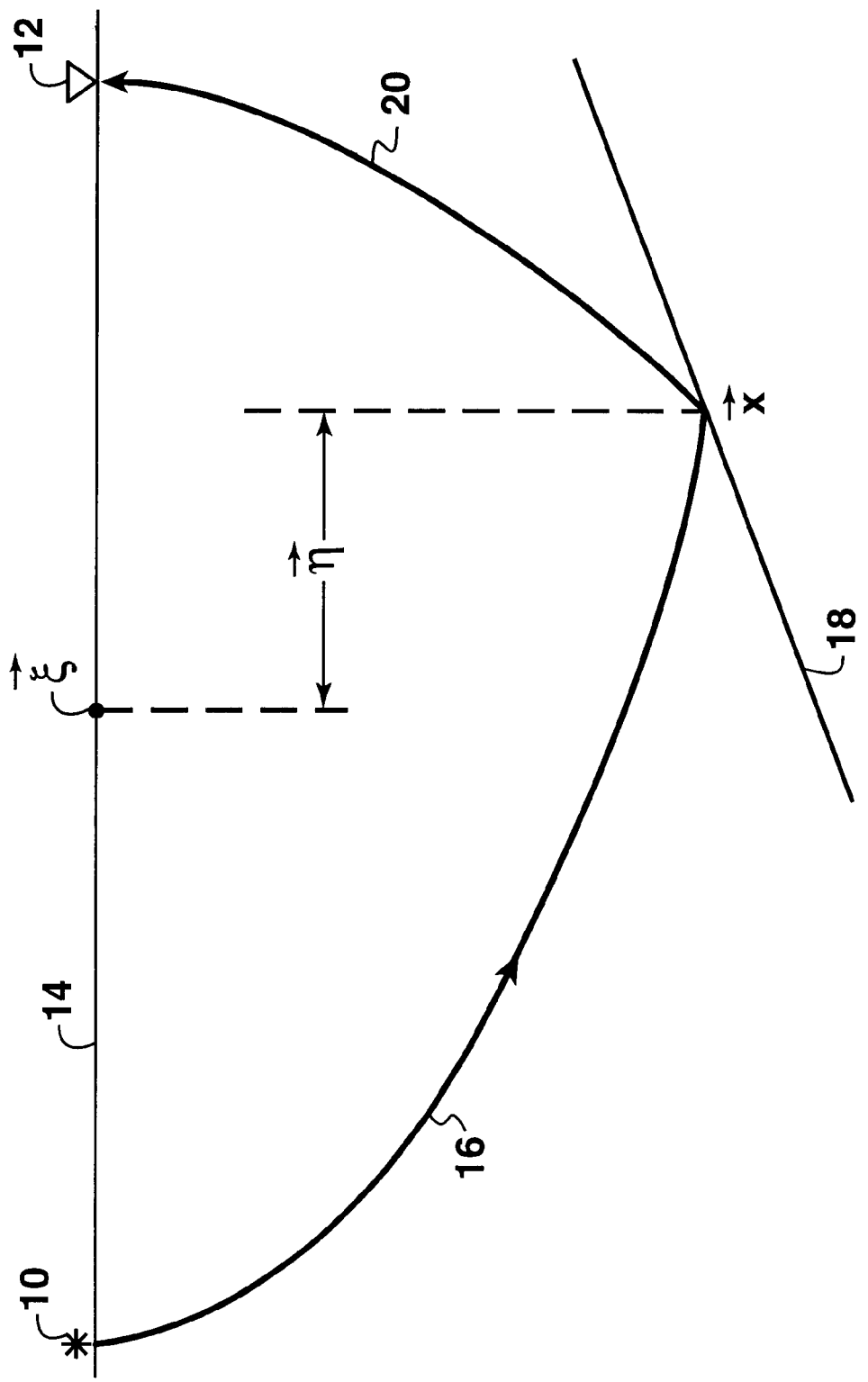
FIG. 1 is a sketch of the basic geometry used in common-offset prestack time migration according to the present invention.
Figure 2:
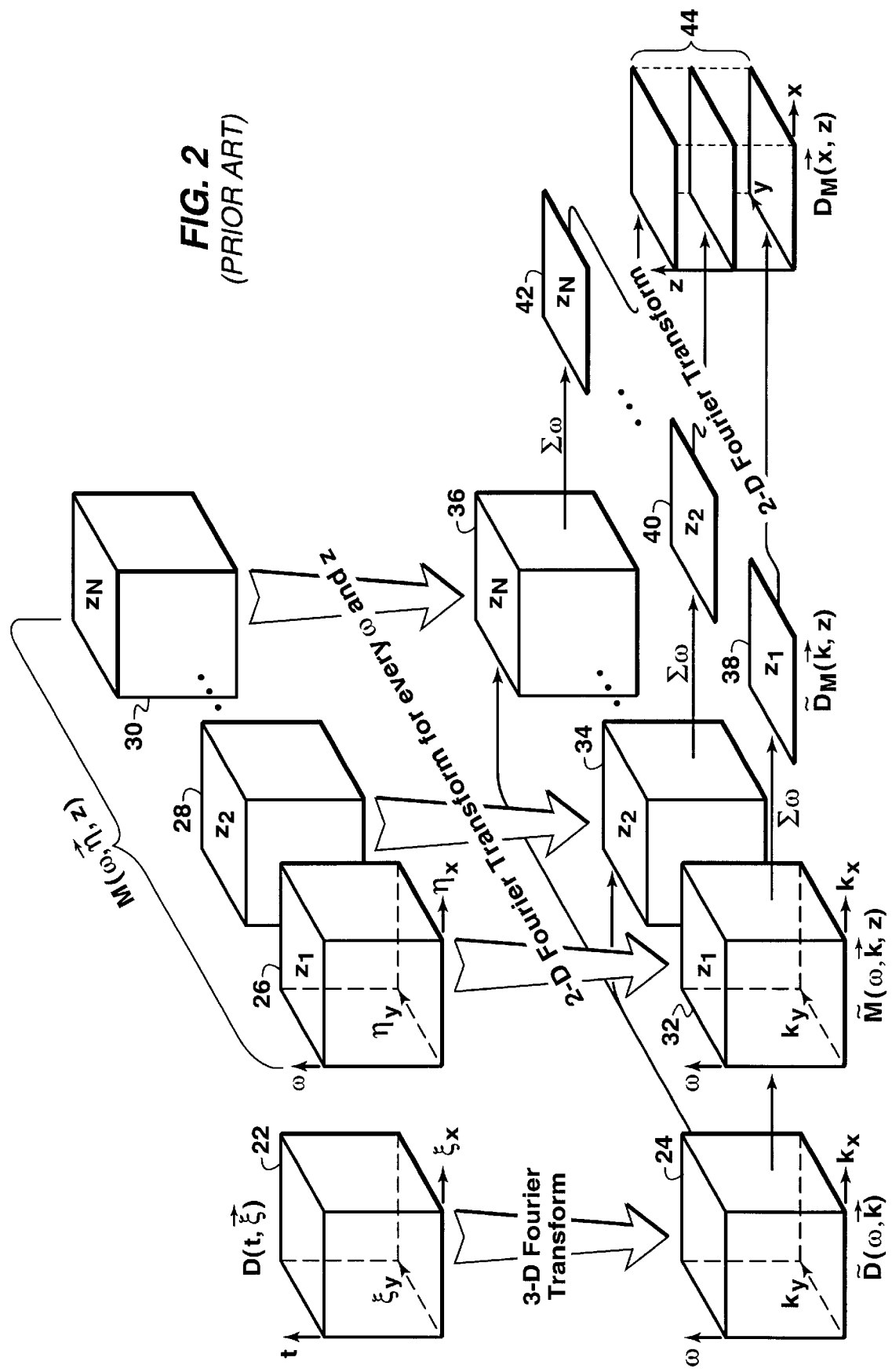
FIG. 2 is a pictorial representation of the method of prestack time migration in the $\omega-\vec{k}$ domain proposed by Etgen.

As noted above, and illustrated in FIG. 2, the method of Etgen requires a 2-D Fourier transformation of the operator from the $\omega - \vec{\eta}$ domain to the $\omega - \vec{k}$ domain at each value of $\omega$ and z. This means that the method requires on the order of $N^4 \ln(N^2)$ operations to construct the migration operator. This means that the Etgen method is slower than the method presented herein by a factor of $\ln(N^2)$ operations. Since N is on the order of 1000, this amounts to a factor of about $\ln(10^6)$ or about an order of magnitude.

As noted above, the present invention may also be implemented in other alternate data domains. These alternate data domain implementations of the invention have the same computational advantages as discussed above with respect to implementation in the $\omega - \vec{k}$ domain.

Implementation in $\vec{k}$-t Space

By methods similar to those described above for $\omega - \vec{k}$ implementation, the following equations can be derived for controlled amplitude prestack time migration in the $\vec{k}$-t domain:

$$D_M(\vec{x}, z) = \int \int d^2 \vec{k} dt e^{-i\vec{k} \cdot \vec{x}} \tilde{D}(t, \vec{k}) w \left(\frac{\partial}{\partial t}\right)^{1/2} \frac{e^{i\vec{k} \cdot \vec{\eta}}}{\Delta^{1/2}} \quad (9)$$

where now the input data $\tilde{D}(t, \vec{k})$ are in the $\vec{k}$-t domain (and are obtained by a 2-D Fourier transformation from the $\vec{\xi}$-t domain), w is the same weight function used in equations (1) and (2), and the denominator $\Delta$ is given by $$\Delta \equiv p_2^2 M_{11} - 2p_1 p_2 M_{12} + p_1^2 M_{22}, \; p_i = \frac{\partial t_D}{\partial \eta_i} \quad (10)$$

where $$M_{ij} = \frac{\partial^2 t_D}{\partial \eta_i \partial \eta_j}. \quad (11)$$

Preferably, the migration operator is initially calculated in the $\vec{\eta}$-z domain, and is converted to the $\vec{p}$-z domain before being applied to the transformed data traces $\tilde{D}(t, \vec{k})$, as with the previous embodiment.

Evaluation of equation (9) has the same computational efficiency as does equation (2) in the $\omega - \vec{k}$ domain. In this case, the image is formed in $\vec{k}$ space by the summation over time t, and the data are subsequently transformed from $\vec{k}$ space back to $\vec{x}$ space. Just as in the $\omega - \vec{k}$ domain method, computation time is dominated by the imaging step and takes on the order of $N^4$ operations.

Implementation in $\tau - \vec{p}$ Space

The present invention may also be implemented in the slant-stack or $\tau - \vec{p}$ domain. By setting $\vec{k} = \vec{p} \omega$, equation (2) may be rewritten as follows:

$$D_M(\vec{x}, z) = -\frac{\partial^2}{\partial T^2} \int d^2 \vec{p} \tilde{D}(T - \vec{p} \cdot \vec{x}, \vec{p}) \frac{w}{K_{3D}^{1/2}} \quad (12)$$

The input data $\tilde{D}(T - \vec{p} \cdot \vec{x}, \vec{p})$ on the right hand side of equation (12) are in the $\tau - \vec{p}$ domain, with $\tau = T(\vec{p}, z) - \vec{p} \cdot \vec{x}$. $w/K_{3D}^{1/2}$ is the same amplitude preserving weight function discussed above with respect to equation (2). Evaluation of equation (12) appears to be proportional to $N^5$ operations. However, as in the previous cases, the summation can be rewritten such that implementation is proportional to $N^4$ operations. This can be done by making a 2-D Radon transform to Radon transform coordinates $(P, \zeta)$ to obtain the following equation:

$$\tilde{D}_M(P, \hat{\zeta}, z) = \frac{\partial}{\partial P} \int du \tilde{D}(uP + T(u\hat{\zeta}), u\hat{\zeta}) \cdot \frac{w}{K_{3D}^{1/2}} \quad (13)$$

Equation (13) now represents an imaging condition where the summation over variable u (the Fourier conjugate of P) is analogous to the imaging summations over $\omega$ and t discussed above. The number of operations required to implement equation (13) is proportional to $N^4$. The inverse Radon transform required to return from P-$\zeta$ space to $\vec{x}$-z space can be evaluated as a product of two fast Fourier transforms and is analogous to the previously discussed final transforms to return from $\vec{k}$ space to $\vec{x}$ space. As with the $\omega - \vec{k}$ and $\vec{k}$-t embodiments, the migration operator preferably is initially computed in the $\vec{\eta}$-z domain, and is converted to the $\vec{p}$-z domain before being applied to the transformed data traces $\tilde{D}(uP + T(u\hat{\zeta})u\hat{\zeta})$. The data are obtained in the $\tau - \vec{p}$ domain by first transforming to the $\omega - \vec{k}$ domain with a 3-D Fourier transformation and then transforming to the $\tau - \vec{p}$ domain by a 1-D Fourier transformation at fixed $\vec{p} = \vec{k}/\omega$ as in equation (8). Both of these steps require on the order of $N^3 \ln(N)$ operations.

A description of $\tau - \vec{p}$ migration is given in Hubral, P., *Slant Stack Processing*, pp. 111–117, edited by G. Gardner and L. Lu, published by the Society of Exploration Geophysicists (1991). Hubral, however, confined his discussion to migration of poststack data, and also did not discuss either how to make the process amplitude preserving or how to optimize the computational efficiency of the method.

The foregoing description has been directed to particular embodiments of the invention for the purpose of illustrating the invention. It will be apparent to persons skilled in the art, however, that many modifications and variations to the embodiments described herein are possible. For example, in any of the foregoing embodiments, the final migrated image could easily be output with respect to vertical time (e.g., in the $\vec{x}$-t domain) rather than with respect to vertical depth (the $\vec{x}$-z domain). All such modifications and variations are intended to be within the scope of the present invention, as defined by the appended claims.

We claim:

1. A method for prestack time migration of common-offset seismic data traces, said method comprising the steps of:

selecting a seismic velocity function for use in said prestack time migration;

transforming said common-offset seismic data traces from the space-time domain to the $\omega - \vec{k}$ domain;

using said seismic velocity function to compute a time function in the $\vec{p}$-z domain for accurately migrating said seismic data traces;

computing a weighting function in the $\vec{p}$-z domain, which weighting function substantially preserves the seismic amplitudes of said seismic data traces;

using said time function to phase shift said seismic data traces in said alternate data domain;

multiplying the amplitudes of said phase-shifted seismic data traces by said weighting function;

forming an image in said alternate data domain by summing said phase-shifted and amplitude-weighted data traces over frequency ($\omega$); and performing a 2-D transformation of said image from said alternate data domain back to the space domain.

2. The method of claim 1, wherein said time function and said weighting function are initially computed in the $\vec{\eta}$-z domain and are converted to the $\vec{p}$-z domain before being applied to the transformed data traces.

3. The method of claim 1, wherein said common-offset seismic data traces are adjusted to compensate for the effects of lateral velocity variations prior to transforming said seismic data traces to the $\omega$-$\vec{k}$ domain by applying NMO to said seismic data traces using selected local velocities and then applying a reverse NMO to said seismic data traces using said velocity function.

4. A method for prestack time migration of common-offset seismic data traces, said method comprising the steps of:

selecting a seismic velocity function for use in said prestack time migration;

performing a 3-D Fourier transformation of said common offset seismic data traces from the space-time ($\vec{\xi}$-t) domain to the wavenumber-frequency ($\omega$-$\vec{k}$) domain;

using said seismic velocity function to compute a time function in the $\vec{\eta}$-z domain for use in migrating said seismic data traces;

computing a weighting function in the $\vec{\eta}$-z domain, which weighting function substantially preserves the seismic amplitudes of said seismic data traces;

for every z, performing 2-D transformations of said time function and said weighting function from the $\vec{\eta}$-z domain to the $\vec{p}$-z domain;

using said $\vec{p}$-z domain time function to phase shift said $\omega$-$\vec{k}$ domain data traces;

multiplying the amplitudes of said phase-shifted $\omega$-$\vec{k}$ domain data traces by said $\vec{p}$-z domain weighting function;

forming an image in the $\vec{k}$-z domain by summing said phase-shifted and amplitude-weighted $\omega$-$\vec{k}$ domain data traces over frequency; and performing a 2-D Fourier transformation of said image from the $\vec{k}$-z domain to the $\vec{x}$-z domain.

5. The method of claim 4, wherein said step of performing 2-D transformations of said time function and said weighting function from the $\vec{\eta}$-z domain to the $\vec{p}$-z domain further comprises the steps of:

for each depth z, computing the values of said time function and said weighting function for a regular grid in $\vec{\eta}$ space; and for each depth z, resampling said time function and said weighting function from said regular grid in $\vec{\eta}$ space to a regular grid in $\vec{p}$ space to be used in a table look-up procedure during said prestack time migration.

6. The method of claim 5, wherein said step of resampling further comprises the steps of:

decomposing the Cartesian cells of said regular grid in $\vec{\eta}$ space into triangles and computing the values of $\vec{p}$ at the corners of said triangles; and for each triangle, selecting an interpolating function and evaluating the parameters of said interpolating function using the values of $\vec{p}$ at the corners of said triangle, using said interpolating function to determine the minimum and maximum values of $\vec{p}$ within said triangle, using said minimum and maximum values of $\vec{p}$ to determine whether there are any points within said triangle having $\vec{p}$ values that fall on the desired regular grid in $\vec{p}$ space, computing the values of $\vec{\eta}$ for each such point within said triangle, and using said $\vec{\eta}$ values to determine the values of said time function and said weighting function for each such point.

7. The method of claim 6, wherein said interpolating function is a linear interpolating function.

8. The method of claim 4 wherein said time function and said weighting function are computed over a range of $\vec{\eta}$ values large enough to include seismic turning ray energy, whereby said prestack time migration method may be used to image overturned reflectors.

9. The method of claim 4, wherein said method is performed on a parallel processor having a plurality of separate processor units that execute different portions of said method according to a preselected plan.

10. The method of claim 9, wherein said parallel processor is parallelized with respect to depth z.

11. The method of claim 9, wherein said parallel processor is parallelized with respect to frequency $\omega$.

12. The method of claim 9, wherein said parallel processor is parallelized with respect to wavenumber $\vec{k}$.

13. The method of claim 9, wherein said parallel processor includes at least one input/output processor, a plurality of migration processors, and a disk storage unit, and wherein said preselected plan further comprises the steps of:

parallelizing said 3-D Fourier transformation of said common offset seismic data traces from the $\vec{\xi}$-t domain to the $\omega$-$\vec{k}$ domain among said migration processors according to temporal frequency;

storing said $\omega$-$\vec{k}$ domain data in said disk storage unit;

parallelizing said steps of computing said time function, computing said weighting function, and converting said time function and said weighting function to the $\vec{p}$-z domain among said migration processors according to depth, each said migration processor retaining its portion of said $\vec{p}$-z domain time function and said $\vec{p}$-z domain weighting function;

using said input/output processor to select individual frequency slices of said $\omega$-$\vec{k}$ domain data and distribute said frequency slices to said migration processors;

using each migration processor to apply its portion of said $\vec{p}$-z domain time function and said $\vec{p}$-z domain weighting function to each said frequency slice;

summing each migrated frequency slice into an accumulation buffer for each depth; and using said migration processors to inverse Fourier transform said image from the wavenumber domain to the space domain.

14. The method of claim 4, wherein said common-offset seismic data traces are adjusted to compensate for the effects of lateral velocity variations prior to transforming said seismic data traces to the $\omega$-$\vec{k}$ domain by applying NMO to said seismic data traces using selected local velocities and then applying a reverse NMO to said seismic data traces using said velocity function.

* * * * *